(12) United States Patent
Tóth et al.

(10) Patent No.: US 8,325,626 B2
(45) Date of Patent: Dec. 4, 2012

(54) LIGHTWEIGHT MOBILITY ARCHITECTURE

(75) Inventors: Gábor Tóth, Szigetszentmiklós (HU);
András Császár, Budapest (HU); Attila Mihaly, Dunakeszi (HU); Zoltán Richárd Turányi, Szentendre (HU)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 363 days.

(21) Appl. No.: 12/523,664

(22) PCT Filed: Jan. 14, 2008

(86) PCT No.: PCT/SE2008/000028
§ 371 (c)(1),
(2), (4) Date: Mar. 5, 2010

(87) PCT Pub. No.: WO2008/088271
PCT Pub. Date: Jul. 24, 2008

(65) Prior Publication Data
US 2010/0172293 A1 Jul. 8, 2010

Related U.S. Application Data

(60) Provisional application No. 60/880,957, filed on Jan. 18, 2007.

(51) Int. Cl.
*H04J 1/16* (2006.01)
*H04L 12/56* (2006.01)

(52) U.S. Cl. ......... 370/254; 370/252; 370/331; 370/389
(58) Field of Classification Search .................. 370/252, 370/254, 331, 389
See application file for complete search history.

(56) References Cited

U.S. PATENT DOCUMENTS

| | | |
|---|---|---|
| 2004/0221042 A1 | 11/2004 | Meier |
| 2007/0002833 A1 | 1/2007 | Bajic |
| 2010/0165947 A1* | 7/2010 | Taniuchi et al. ............. 370/331 |
| 2011/0317580 A1* | 12/2011 | Kozisek et al. ............. 370/252 |

FOREIGN PATENT DOCUMENTS

| | | |
|---|---|---|
| EP | 1 404 143 A2 | 3/2004 |
| EP | 1 408 666 A1 | 4/2004 |

* cited by examiner

*Primary Examiner* — John Pezzlo

(57) ABSTRACT

Mobility between access domains in an Internet Protocol (IP) network can be supported by introducing a so-called Mobility Manager (MM) that maintains a database of currently attached devices and their current access domain location. The mobility manager may then detect, for a device registered in the database, a change of access domain from a first access domain to a second access domain by monitoring connection maintenance signaling related to the considered device. The mobility manager should at least obtain an indication of such a change of access domain. In response to a detected change of access domain, the mobility manager arranges for a reconfiguration of the network to forward traffic destined to an IP address of the device in the first access domain to a new location in the second access domain. In this way, the mobility manager allows the device to keep its IP address when moving between access domains.

20 Claims, 10 Drawing Sheets

LIGHTWEIGHT MOBILITY ARCHITECTURE

TECHNICAL FIELD

This application claims the benefit of U.S. Provisional Application No. 60/880957, filed Jan. 18, 2007, the disclosure of which is fully incorporated herein by reference.

The present invention generally relates to communication technologies and the issue of supporting mobility between access domains in an Internet Protocol (IP) network, and more particularly to layer 3 mobility aspects in network communication, typically wireless communication.

BACKGROUND

Mobility has been a key research and business issue in the last decades. Many layer 2 wireless access systems have evolved like WLAN (WiFi) or WiMax. These systems solve the handover problem of a terminal moving into the range of another base station (wireless access point). The question of mobility in layer 3 (i.e. IP layer) is how to retain the IP address of a terminal that re-attaches at another router or performs handover to another router. Ideally, the handover process should be seamless from the user's point of view.

Mobile IP (MIP) is a technology to enable mobility in the IP layer. The mobile node (MN) always retains its home address (HoA). Traffic destined to the home address of the terminal is tunneled to the new location of the mobile from the home agent (HA) that resides in the home network of the MN. Since the home address of the terminal is topologically incorrect in visited networks, tunneling is needed for transport. The home agent uses the new local address of the terminal as the destination of the tunnel; hence the mobile node needs to keep the home agent informed about its new location information by sending binding update (BU) messages. These messages periodically notify the home agent about the new local address (also known as care-of-address, CoA) of the terminal. The home agent uses a binding cache to store the current CoA of the mobile node. The mobile node is required to be configured with some parameters relating to MIP. It must know its own home address, the IP address of its home agent and also needs a mechanism to acquire IP address on a visited network (DHCP or Neighbour Discovery).

In other words, Mobile IP (e.g. MIPv4, MIPv6) allows a mobile node to change its point of attachment to the Internet with minimal service disruption. For example, the MIP version 6 (MIPv6) protocol [1] allows nodes to move within the Internet topology while maintaining reachability and on-going connections with correspondent nodes.

MIPv6 capable mobile nodes, such as cellular phones, laptops and other end-user equipment, can thus roam between networks that belong to their home service provider as well as others. Roaming in foreign networks is enabled as a result of the service level and roaming agreements that exist between operators. MIPv6 provides session continuity within a single administrative domain, but typically depends on the availability of an Authentication, Authorization and Accounting (AAA) infrastructure to provide services across different administrative domains, i.e. when roaming outside the network administered by the home operator.

For a better handover performance some major improvements have been proposed. A key observation is that mobile handover in most cases happens between neighbouring base stations. In this case the mobility should be handled somehow "locally" since traffic can still arrive at the same root gateway of the network. This idea led to create a hierarchy, and split mobility into micro- and macro-mobility.

Micro-mobility handles the movements within a geographically limited area, called mobility domain. Mobility domains are usually under the management of a single entity resulting in a protected and trusted environment between network nodes. Inside mobility domains mobility can be handled locally, which makes it fast and transparent from the perspective of network areas outside the mobility domain.

Mobility between domains is handled by macro-mobility mechanisms, which do not have to be quick, since such mobility is rare. On the other hand, macro mobility must operate globally in a less trusted environment. Examples of micro-mobility protocols include Cellular IP and Hawaii, while Mobile IP is the prime example of IP layer macro-mobility.

Hierarchical Mobile IPv6 (HMIPv6) [2] is a micro-mobility protocol re-using MIPv6 messages and mechanisms. As illustrated in FIG. 1, HMIPv6 adds a new hierarchy level to existing Mobile IPv6 architecture by adding a new entity called Mobility Anchor Point (MAP). Mobility under the umbrella of a MAP 1-1, 1-2 is handled by HMIP, whereas mobility between MAPs is handled by MIP. The MAP can help in providing seamless mobility for a moving mobile node 2-2, while the mobile node is communicating with a correspondent node (CN) 3. As previously explained, the mobile node (MN) always retains its home address (HoA). Traffic destined to the home address of the mobile node is tunneled to the new location of the mobile from the home agent (HA) 4 that resides in the home network of the MN. In HMIPv6 mobile terminals in the visited network have two types of care-of-address: one for current link, called On-Link Care-of-Address (LCoA), and another that is allocated at the current MAP 1-2, called Regional Care-of-Address (RCoA). The binding between these care-of-addresses is kept by the MAP 1-2, which acts like a "local home agent" for the mobile node 2-2. In case of intra-area handover the mobile node or terminal 2-2 sends binding update (BU) messages for the LCoA-RCoA binding to the MAP 1-2. If the mobile node moves to another area, then the MN sends regular MIP binding update messages for the new RCoA-HoA binding to the Home Agent 4.

All previous solutions rely on extensive support from the terminal. Most importantly, a mobility (e.g. Mobile IP) protocol stack has to be implemented in the terminal. However, as terminals typically do not implement Mobile IP today, such solutions are impractical for everyday laptops and PDAs running, e.g., different versions of the Microsoft Windows operating system. Therefore, another mobility research direction tries to create an architecture where the terminal is not expected to perform new functions but the required functions are moved to the network. This is called network-based or network-centric mobility, where the complexities assigned to micro-mobility and fast handover are placed in the network. The intention is to be able to move and make seamless handovers across routers without adding mobility specific functions to terminals.

For example, the NETLMM working group of IETF is working on network centric mobility protocols. Several approaches have already been investigated, one proposed by a design team [5] and another called Proxy-Mobile IP (PMIP) [6]. The solution proposed in reference [5] defines a separate protocol to manage mobility between a Local Mobility Agent (LMA) and Mobility Access Gateways (MAG). MNs attach to one of the MAGs. The LMA stores the identity of current MAG and tunnels downlink packets to it. The PMIP solution employs a Home Agent as anchor and uses MIP signaling for mobility update. However, the functions that reside in the MN in case of MIP are moved to the access router, thereby eliminating the need for mobility specific functions in the Mobile Node.

Each of the above technologies is unfavorable due to at least one of the following reasons:
  requires new functionality in the terminal, and
  requires many new functions in network nodes.

Mobile IP, HMIP, Cellular IP or Hawaii require the implementation of the corresponding protocols in the terminal. As a matter of fact, Microsoft, for example, has no plans to include IP mobility (more specifically Mobile IP) support in the upcoming release of its operating system.

PMIP and other network-centric protocols, on the other hand, do not require support from the terminal; however, they require significant amount of new functions (e.g., the implementation of the new protocol) from the network nodes, which are not available in current IP routers.

SUMMARY

The present invention overcomes these and other drawbacks of the prior art arrangements.

It is a general object of the present invention to provide a simple, yet unique mobility solution relying on existing networking equipment (e.g. routers) for supporting seamless mobility for users having commercially available devices.

In particular it is desirable to provide mobility for devices requiring basic terminal functions only, specifically those that are required anyhow to connect to the network.

In addition, it is desirable to minimize the functions from network nodes, as well, since the network operator cannot be expected to purchase a lot of new nodes in order to support mobility functionality.

It is a specific object to provide a method and system for supporting mobility between access domains in an IP network.

It is also an object of the invention to provide a mobility manager for supporting IP mobility.

A basic idea of the invention is to provide or at least support mobility between access domains in an Internet Protocol (IP) network by introducing a so-called Mobility Manager (MM) that maintains a database of currently attached devices and their current access domain location. The mobility manager may then detect, for a device registered in the database, a change of access domain from a first access domain to a second access domain by monitoring connection maintenance signaling related to the considered device. The mobility manager should at least obtain an indication of such a change of access domain. In response to a detected change of access domain, the mobility manager arranges for a reconfiguration of the network to forward traffic destined to an IP address of the device in the first access domain to a new location in the second access domain. In this way, the mobility manager allows the device to keep its IP address when moving between access domains.

The invention provides a method and system for supporting mobility between access domains in an IP network, as well as a mobility manager for supporting IP mobility.

The present invention preferably provides a lightweight mobility architecture, which typically does not require new functions related to mobility in terminals and does not require new functions related to mobility from a lot of different network nodes. Instead, new functionality may be reduced to a single intelligent node or block in the network (i.e. the Mobility Manager); the rest can be standard IP routers providing functions that are typically widely implemented today.

The solution works for any combination of core and access networks (IPv4 or IPv6) without changing the IP protocol stack on MNs. It also works in any existing transport network technology (IP, MPLS) without interfering with existing protocols and services (VPNs) already deployed.

Other advantages offered by the invention will be appreciated when reading the below description of embodiments of the invention.

BRIEF DESCRIPTION OF THE DRAWINGS

The invention, together with further objects and advantages thereof, will be best understood by reference to the following description taken together with the accompanying drawings, in which.

DETAILED DESCRIPTION

Figure 1:
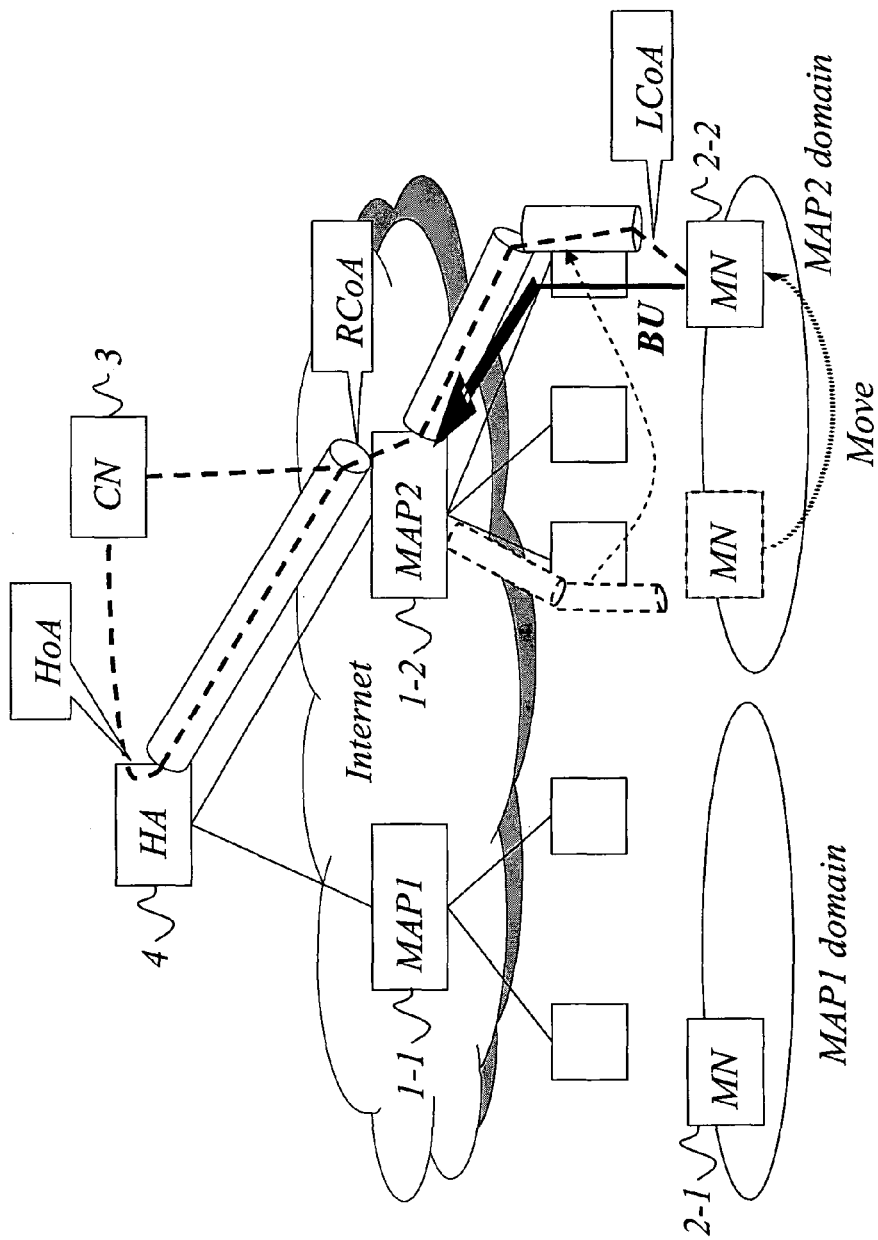
FIG. 1 is a schematic diagram illustrating an example of micro-mobility in HMIPv6.

Throughout the drawings, the same reference characters will be used for corresponding or similar elements.

As it was described before, an exemplary aim with developing a new mobility architecture is to define a simple solution primarily relying on existing networking equipment (e.g. routers) for providing seamless mobility for users having commercially available devices. Seamless mobility typically means that the ongoing communication of the user is not affected when the user moves between areas served by different access points or technologies.

It is also an exemplary aim to provide mobility for devices requiring basic terminal functions only, specifically those that are required anyhow to connect to the network. Consider for example a laptop computer with the Windows operating system, which has multiple wired and wireless network interfaces, e.g. UTP Ethernet plug, IEEE 802.11g WiFi adapter and a Bluetooth adapter. In this case, one can assume that the computer is able to use the network devices in parallel and communicate with the different access networks at the same time. But, it can not be assumed that it runs the Mobile IP protocol stack and can handle movements between IP subnets.

In addition, it may also be desirable to minimize the functions in network nodes as well, since the network operator cannot be expected to purchase a lot of new nodes in order to support mobility functionality.

The present invention preferably proposes a lightweight mobility architecture, which typically does not require new functions related to mobility in terminals and does not require new functions related to mobility from a lot of different network nodes, as well. Instead, new functionality may be reduced to a single intelligent node or box in the network; the rest can be standard IP routers providing functions that are typically widely implemented today.

Figure 2:
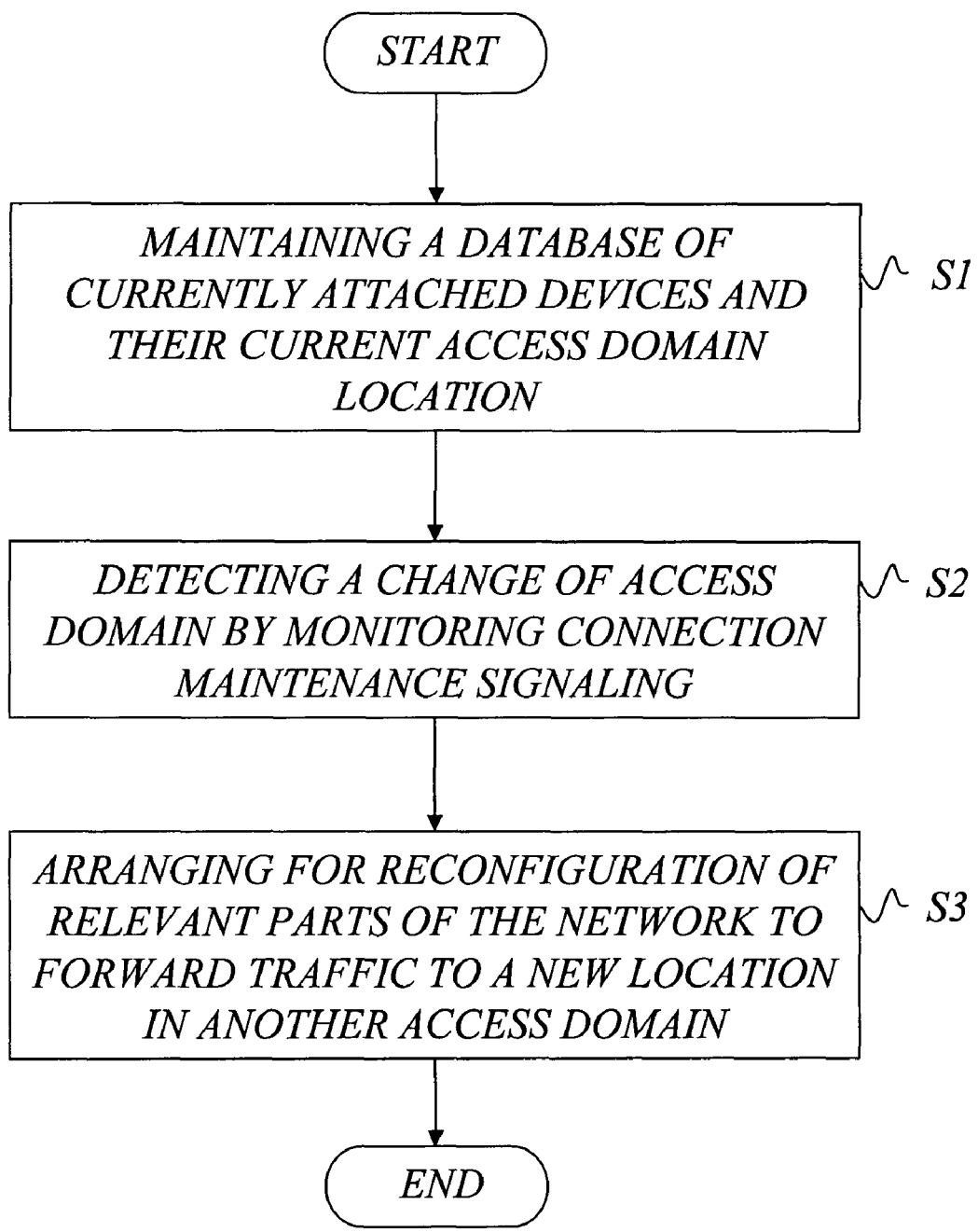
FIG. 2 is a schematic flow diagram illustrating a method according to a preferred exemplary embodiment of the invention.

FIG. 2 is a schematic flow diagram illustrating a method according to a preferred exemplary embodiment of the invention. A basic idea is to introduce a so-called Mobility Manager (MM) that maintains a database comprising a list of currently attached devices such as mobile terminals or mobile nodes and their current access domain location (i.e. the ID of the current access router), as schematically indicated in step S1. Next, a change of access domain is detected for a registered device by monitoring connection maintenance signaling, such as authentication and/or address configuration signaling, related to the considered device, as indicated in step S2. In step S3, the mobility manager then arranges for a reconfiguration of relevant parts of the network to forward traffic destined to the IP address assigned to the device in the previous access domain to a new location in another access domain. This provides a complete solution for downlink traffic to each considered device, while allowing the device to keep its IP address.

The invention is not only applicable to wireless access, but also useful with other access types (even plain Ethernet) and so-called nomadic applications. Accordingly, the invention is not limited to mobile telephones or similar standard mobile terminals, but is generally applicable to any device that may change access domain (IP domain or subnet) including portable or handheld devices, laptops, and other "moving" or "movable" devices that can be attached to an IP network. Throughout the disclosure, terms such as "mobile node", "mobile terminal", "mobile", "moving terminal", "user device" and "device" will be used interchangeably.

Figure 3:
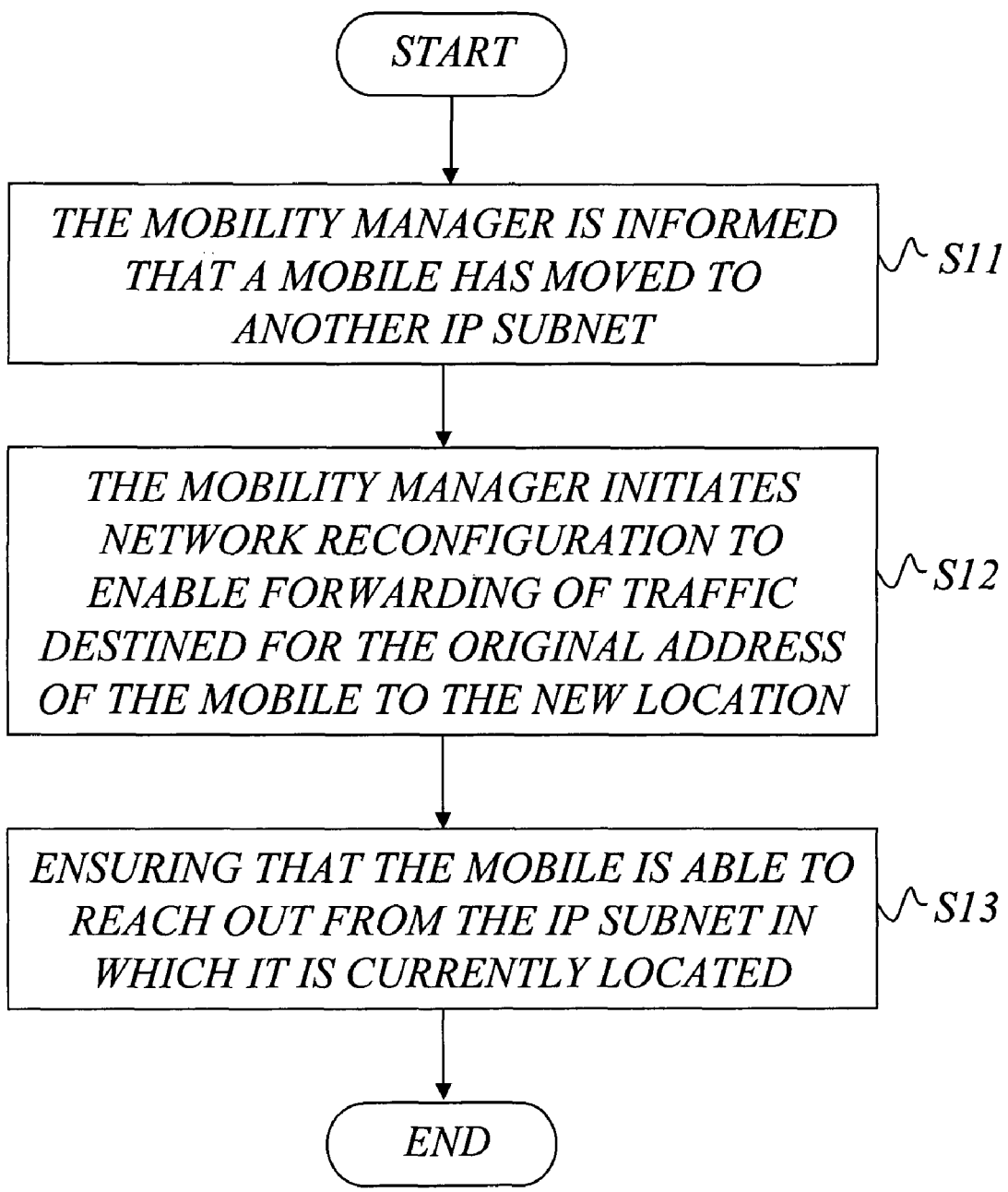
FIG. 3 is a schematic flow diagram illustrating a method according to another exemplary embodiment of the invention.

FIG. 3 is a schematic flow diagram illustrating a method according to another exemplary embodiment of the invention. As mentioned, the mobility solution should allow a device such as a mobile to keep its IP address when the mobile moves between access domains, also referred to as IP domains or IP subnets. Each access domain is normally served by a respective access router. First, the network should be informed when a user moves from one IP subnet to another subnet (triggering of handover). In the invention this means that the mobility/handover procedure executed by the mobility manager is triggered when a mobile changes from one IP subnet or access router to another. The mobility manager then initiates a network reconfiguration, at least for the complicated downlink case, so that the network is able to forward the traffic destined to the mobile's original address to the mobile's new location (downlink) and, for an overall solution including both downlink and uplink, so that the mobile terminal is also able to reach the world further on (uplink). The mobility manager thus allows the mobile to retain the same IP address in the new access domain as in the previous access domain.

For a better understanding of the invention, various exemplary and non-limiting embodiments will now be described.

When the mobile moves between IP domains while keeping its IP address an exemplary overall mobility procedure involves the following main parts:

S1: The network must be informed that the user moved from one IP subnet to another (triggering)
S2: The network must be reconfigured to be able to forward the traffic destined to the mobile's original address to the mobile's new location (downlink)
S3: It must be ensured (via standard way) that the mobile terminal is able to reach the world further on (uplink)

In a sense, this is a layer-2 triggered solution for layer-3 (IP) mobility.

The mobility manager (MM) can be implemented in a separate node in the layer-3 network, or integrated in an existing and/or enhanced network node such as an AAA server (or proxy) or in a DHCP server. When the mobility manager MM is implemented in a separate unit it should preferably be able to capture signaling that indicates a change of IP subnet.

In other words, in response to a trigger event such as an authentication and/or IP address configuration request, the mobility manager MM initiates reconfiguration of the network to be able to deliver IP packets sent to/from the mobile terminal or mobile node (MN), which now resides at a new location in a foreign IP domain but which kept its IP address.

The invention provides different alternative methods for triggering handovers including at least:
triggering based on authentication signaling; and
triggering based on IP address configuration (e.g. DHCP) signaling such as address configuration requests.

In general, these are examples of triggering by monitoring connection maintenance signaling related to a device attached to or attaching to the IP network.

In an exemplary authentication based solution, an authentication message is forwarded by the access point to an AAA server. In the second exemplary alternative, the access router relays this message to an IP address configuration node such as a DHCP server. In an exemplary embodiment, the mobility manager MM oversees the messages and if it sees in its database that the considered mobile is a previously registered terminal that moved to a new access router, it will typically:
ensure that the terminal receives the same IP address as before;
ensure that the terminal sends traffic through the new access router (as a default gateway);
add a static route entry in the previous access router for the terminal's destination IP address directing to the tunnel that leads to the new access router;
add a static route entry in the new access router for the terminal's destination IP address pointing to the directly connecting interface the terminal is attached to.

Preferably, the mobility manager MM taps into the original access router and sets up an IP tunnel interface towards the new access router. The mobility manager MM installs a new static route entry into the original access router's routing table, which directs packets destined to the mobile MN into the IP-tunnel interface. The setup of such tunnels may thus be triggered by the MM on-demand when it detects that the MN performs authentication, or sends a DHCP or similar request from an IP domain different to its previous location.

It should be understood that it is also possible to optimize traffic e.g. from the Internet by setting direct tunnels from the Internet gateways or similar gateways towards the access routers. The Internet gateway includes a router or is at least associated with router functionality. In this case, the MM normally adds a static route entry in the router of the gateway for the MN's destination address to point to the virtual interface that corresponds to the IP tunnel leading to the new access router. This aspect of the invention will be described in more detail later on.

Figure 4:
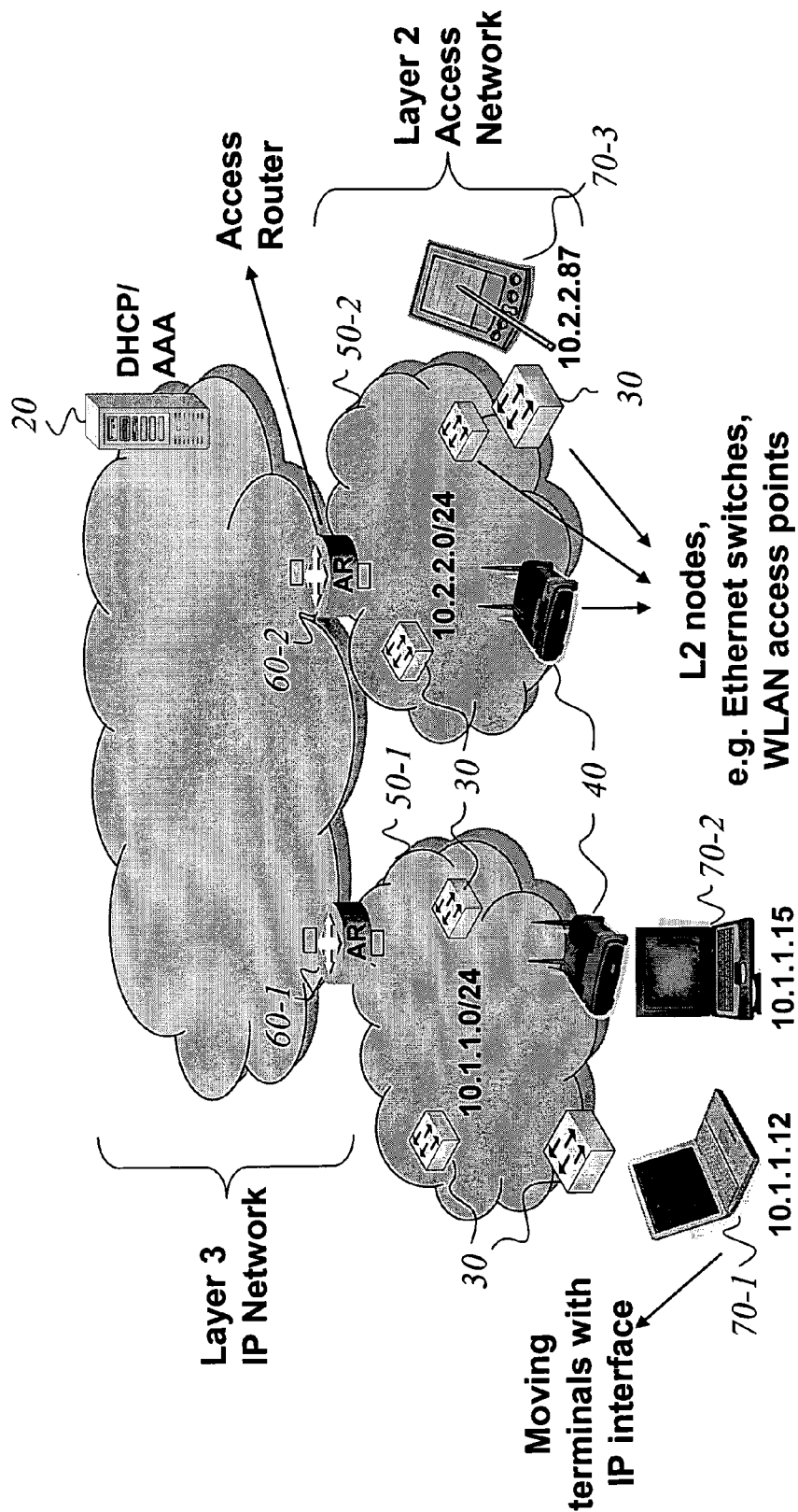
FIG. 4 is a schematic diagram illustrating an exemplary network scenario.

The invention will now be described with reference to a more detailed description of different examples of embodiments. An illustrative network scenario including basic terminology is shown in FIG. 4. The overall network of FIG. 4 basically comprises a layer 3 IP network, and a layer 2 access network. The IP network includes one or more control nodes such as a DHCP and/or AAA server 20 for authentication, address configuration and possibly other standard functionality on the IP layer. The access network includes nodes such as Ethernet switches 30 and WLAN access points 40, and is typically divided into sub-domains or subnets 50-1, 50-2, each of which is served by a respective access router 60-1, 60-2. Devices such as mobile terminals or moving terminals 70-1, 70-2, 70-3 may attach to the various access points of the network.

In the examples below, Access Routers (AR) are assumed to implement the following functions. Note that these functions are implemented practically by all IP router vendors, and Linux also supports all of these functions.

Remote configuration of static routes, i.e. adding/removing routing entries

An IP tunneling mechanism (for example IP-in-IP encapsulation)

Proxy ARP support

The invention proposes alternate methods for triggering handovers based on monitoring connection maintenance signaling. For example, one based on authentication and another based on IP address configuration (typically DHCP) requests. Depending on the alternative, ARs are also normally assumed to possess at least one of the following capabilities (which are also implemented by vendors):

DHCP relay (DHCP based alternative)

802.1x support (authentication based alternative)

A new function, called Mobility Manager (MM), is introduced. The MM normally resides in either an AAA server 20 (or proxy) or in the DHCP server 20 for the authentication based or DHCP based alternatives, respectively. Alternatively, the MM is implemented in a separate network node, as will be described in more detail later on. The MM has a database containing the list of currently attached devices such as mobiles MNs and their current location (the ID of the current AR).

Initially, the exemplary solution normally assumes that a mesh of IP tunnels is set up between access routers. More precisely, here it is normally assumed that the virtual interfaces doing IP encapsulation towards other access routers are installed. Note that instead of simple IP-in-IP encapsulation IPSec tunnels may also be used for enhanced security, or any other tunneling schemes like GRE or MPLS. Additionally, it is also typically assumed that the proxy ARP function is enabled for those interfaces of the access routers that lead to a L2 access network. An example state showing the interface and routing configuration of the access routers is shown in FIG. 5.

An exemplary procedure for seamless handover is as follows.

Figure 5:
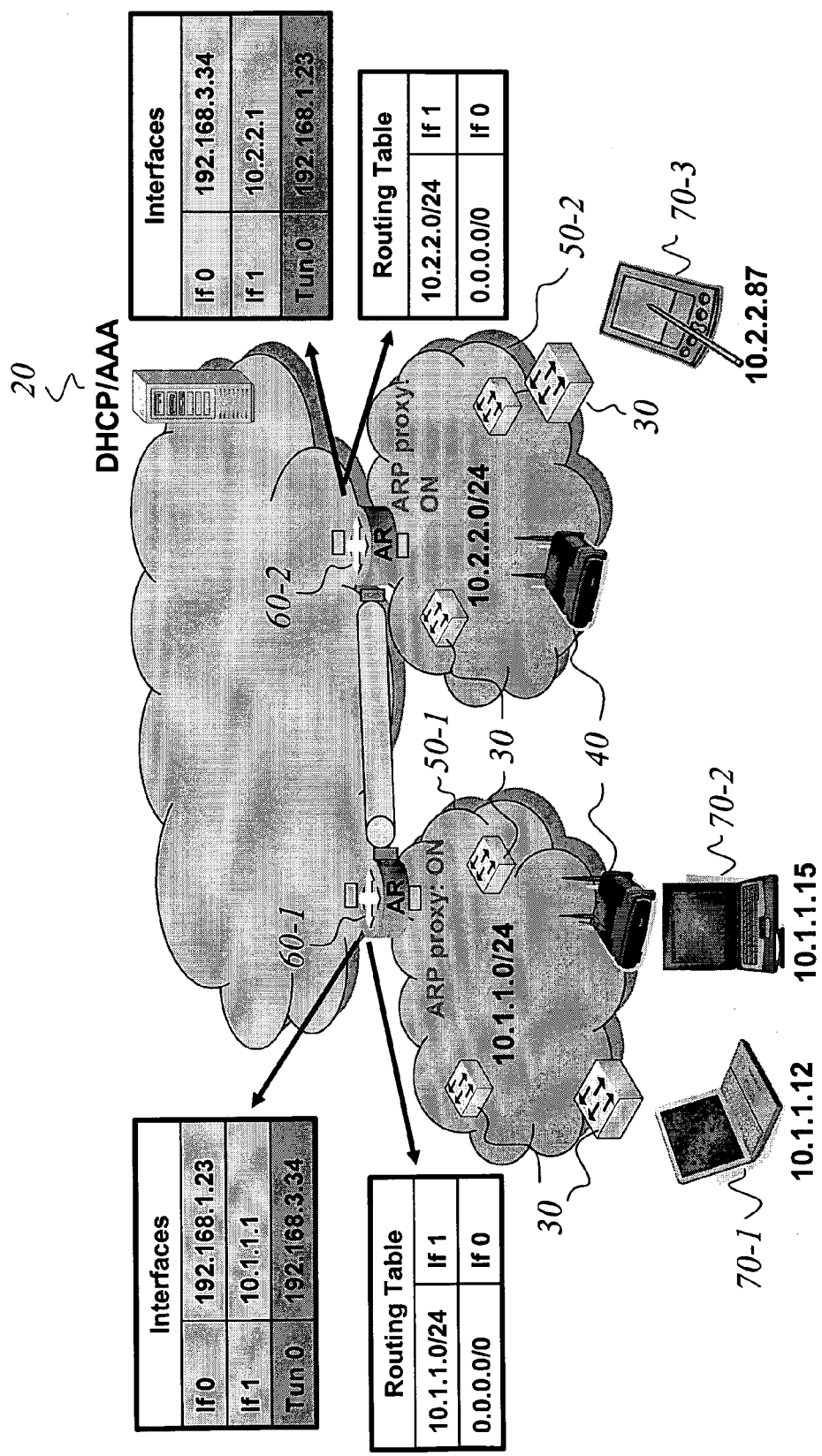
FIG. 5 is a schematic diagram of an example of a network configuration before handover.
Figure 6:
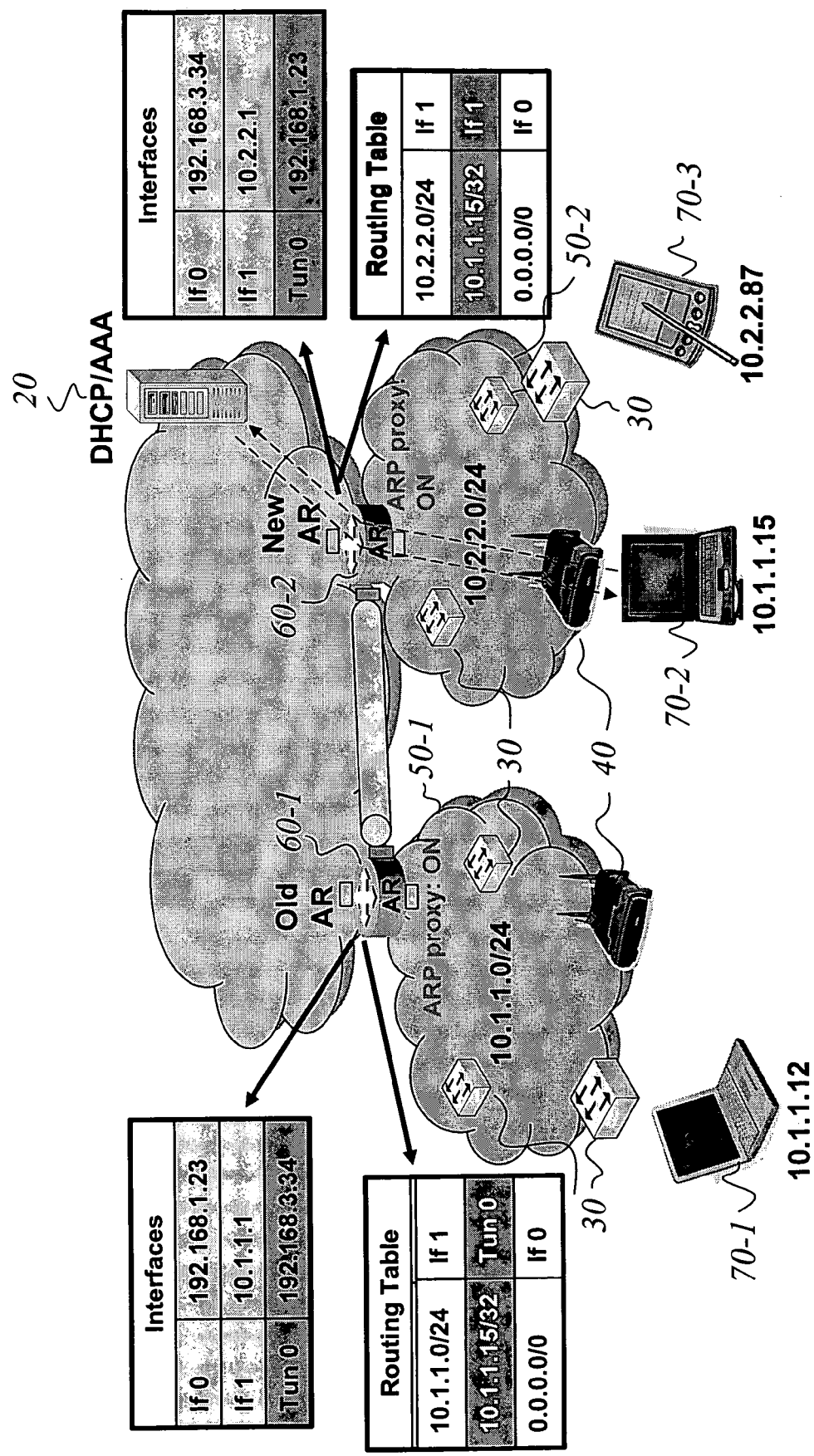
FIG. 6 is a schematic diagram of an example of a network configuration after handover.

When a mobile terminal such as the laptop 70-2 assigned with address 10.1.1.15 in the example of FIGS. 5 and 6 moves to a new L2 access point from sub-domain 50-1 to sub-domain 50-2, it either performs authentication (authentication based trigger) or issues a DHCP or similar request message (DHCP based trigger) or both. These two functions (authentication and address configuration) are viewed as existing functionality in current terminals. For example, using the "MediaSense" L2-trigger in Windows or relying on an 802.1x protocol supported by interface cards and switches or by WPA capable WLAN cards and wireless access points.

In the authentication based solution, the authentication message is forwarded by the access point such as a WLAN access point 40 to an AAA server 20. In the DHCP based alternative the corresponding access router 60-2 relays this message to a DHCP server. The signaling is schematically indicated by dashed lines in FIG. 6.

The invention is mainly described with reference to exemplary embodiments adapted for IPv4. However, it should be understood that the invention is not limited thereto. The invention is also applicable to IPv6 as described later on.

The mobility manager MM intercepts or otherwise captures the messages and if it sees in its database that this is a previously registered terminal that moved to a new access router, it will typically (referring to the example of FIGS. 5 and 6):

ensure that the terminal receives the same IP address as before (10.1.1.5);

ensure that the terminal sends traffic through the new access router (as a default gateway);

add a static route entry in the previous or old access router having the terminal's IP address as a /32 destination network prefix (10.1.1.15/32) directing to the tunnel (Tun 0) that leads to the new access router;

add a static route entry in the new access router for the terminal's IP address as a /32 destination network prefix (10.1.1.15/32) pointing to the directly connecting interface (If 1) the terminal is attached to.

An example of a relevant network configuration after handover is shown in FIG. 6.

Figure 7:
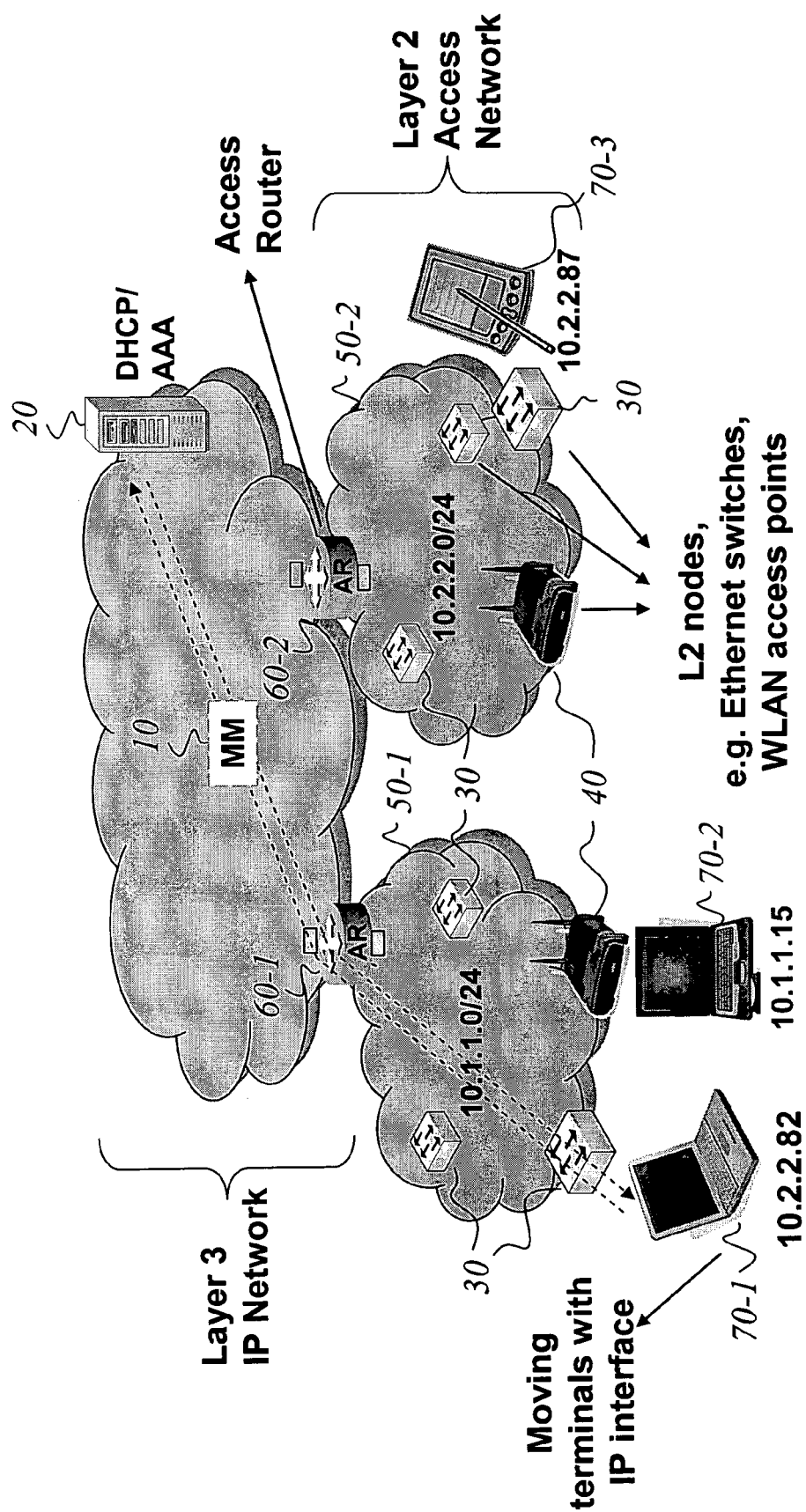
FIG. 7 is a schematic diagram illustrating an example of how a mobility manager MM may be arranged in the network for intercepting connection maintenance signaling between a device such as a mobile terminal and a control node in the IP network.

FIG. 7 is a schematic diagram illustrating an example of how a mobility manager MM 10 may be arranged in the network for intercepting connection maintenance signaling (schematically indicated by dashed lines) between a device such as a moving or mobile terminal, here illustrated as the laptop 70-1 with IP address 10.2.2.82 that has moved from sub-domain 50-2 to sub-domain 50-1, and a control node such as the DHCP/AAA server 20 in the IP network. As previously mentioned, a change of access domain such as a change of IP subnet is preferably based on intercepting connection maintenance signaling between the considered device and a suitable control node 20 in the network. For example, the connection maintenance signaling may include authentication signaling, and the control node 20 is then an AAA (Authentication Authorization Accounting) server. Alternatively, the connection maintenance signaling includes address configuration signaling such as DHCP (Dynamic Host Control Protocol) signaling, and the control node 20 may then be a DHCP server.

Figure 8:
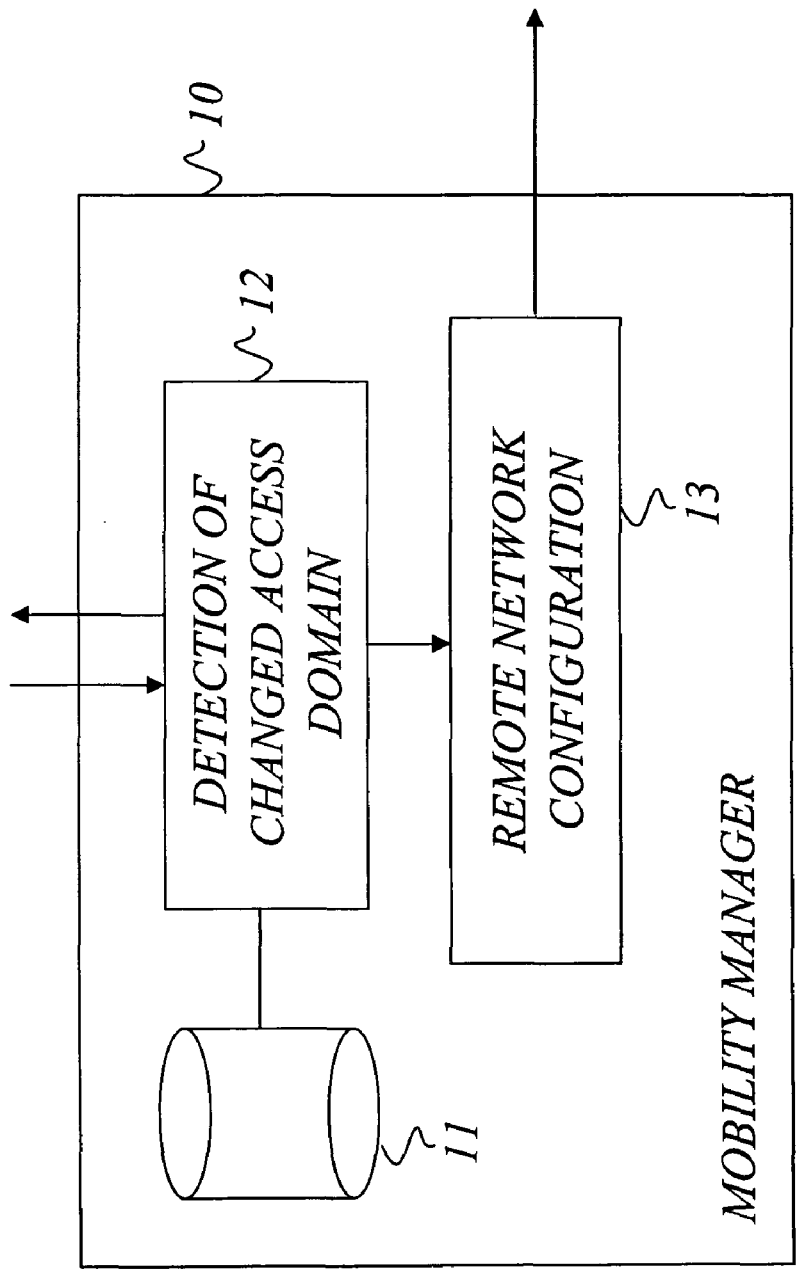
FIG. 8 is a schematic block diagram of a mobility manager according to a preferred exemplary embodiment of the invention.

FIG. 8 is a schematic block diagram of a mobility manager according to a preferred exemplary embodiment of the invention. The mobility manager 10 basically comprises a database 11, a detection module 12 as well as a module 13 for remote network configuration. The database 11 comprises a list of a currently attached devices and their current access domain location. The database may as an alternative be hosted outside the mobility manager 10, with a suitable interface from the mobility manager to the database. The detection module 12 is configured for detecting, for a registered device, a change of access domain or at least for obtaining an indication of such a change of access domain based on monitoring of related connection maintenance signaling. The network configuration module 13 preferably operates based on remote configuration of one or more routers in the network. Basically, the network configuration module 13 arranges for a reconfiguration of the network to forward traffic, destined to an IP address of the considered device in the previous access domain, to a new location of the device in the new access domain, allowing the device to keep its IP address when moving between domains.

Figure 9:
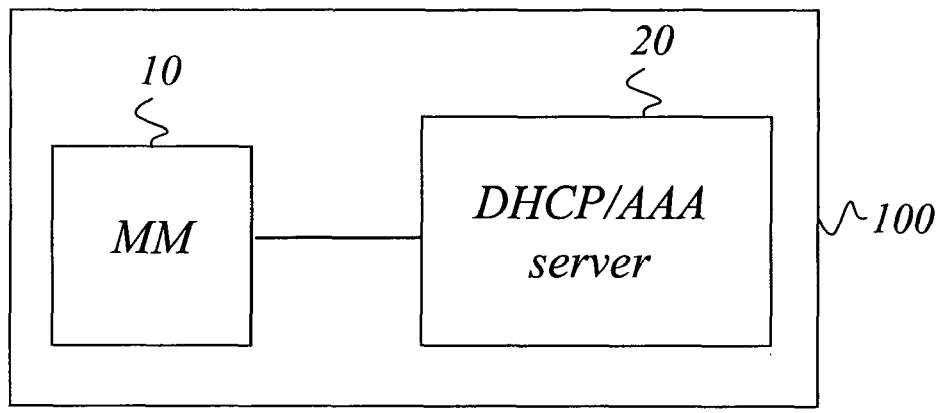
FIG. 9 is a schematic diagram illustrating an exemplary embodiment in which a mobility manager is co-located with a DHCP/AAA server in the same physical network node.
Figure 10:
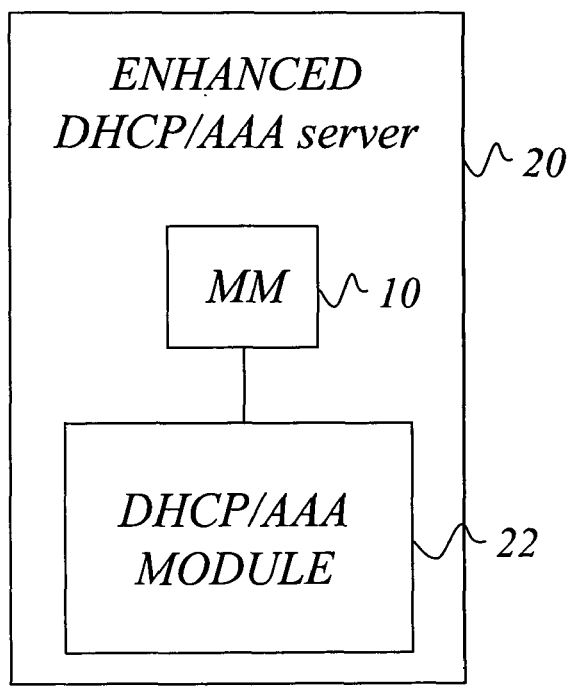
FIG. 10 is a schematic diagram illustrating an exemplary embodiment in which a mobility manager is implemented in an enhanced DHCP/AAA, server.

As previously mentioned, the mobility manager (MM) 10 may be implemented in a separate network node, preferably in the path to/from the DHCP or AAA server, as illustrated in FIG. 7. Alternatively, the MM 10 may be co-located with the DHCP or AAA server 20 in the same physical network node 100, as illustrated in FIG. 9, or perhaps even integrated in an enhanced DHCP or AAA server 20 together with a DHCP/AAA module 22 as illustrated in FIG. 10.

With reference once again to the basic flow diagrams of FIGS. 2 and 3, the main phases of the overall mobility procedure will now be discussed in further detail with reference to exemplary implementations.

Triggering

Several ways can be found for informing the network that the MN has moved between IP domains. During a handover, there are two parties that certainly have information that a move has taken place. One is the MN, the other is the L2 access point. A straightforward solution would be that one of these two equipments, either the MN or the L2 access point, informs the upper layers in the network.

In certain network scenarios, when securing communication is required on the radio interface too, the L2 authentication procedure can be utilized to trigger the L3 mobility procedures. For example, in the 802.1x protocol the terminal is re-authenticated each time it changes to a new access point. However, there could be other authentication protocols for different access types (e.g. WiMAX) that can be used in a similar way as an indication of layer 2 access change. In the exemplary proposed solution denoted as "authentication triggered" solution we utilize the 802.1x protocol to inform the upper layers in network about the IP subnet change.

However, there may be scenarios when authentication is not used. In these situations, the primary goal is to keep both the network and the terminal as simple as possible. Creating or requiring new functionality in either of these equipments would conflict this goal.

Fortunately, the IP protocol suite includes a protocol executed every time when changes in the L2 connection are experienced. This protocol is DHCP, which is intended to automatically obtain configuration information to be used on the specific link from the network. In some cases, it is possible that a L2 event triggers a different mechanism, like Reverse ARP, in which case the Reverse ARP servers should have a functionality of handling L3 mobility. The exemplary solution presented here makes use of the DHCP or similar protocol to inform the network that the MN changes IP domain. This exemplary solution will simply be referred to as the "DHCP triggered" solution.

DHCP Trigger (or Similar)

When the MN makes a handover between L2 access points (or base stations), the handover may take place within the same L3 IP domain or between different L3 domains. What is more important is that the MN may shift from one L2 access domain to another L2 access domain. When the MN moves to another L2 access point, it sends a DHCP request to the DHCP server asking for configuration information to be used on the new link. When the MN is already configured with an IP address, then it may put the address into the request indicating that it intends to keep its existing IP configuration, in accordance with standard DHCP operation. In the proposed exemplary architecture a single DHCP server is deployed in the operator's network or even if more DHCP servers are used the network is arranged in a way that DHCP messages are captured by the Mobility Manager (MM) entity on their way to/from the DHCP server(s). As a result every DHCP request is normally relayed by the access routers to a DHCP server via the MM from each IP subnet in the network. Therefore, access routers need DHCP relay capability so that they can relay the DHCP signaling to the central DHCP server. The MM may for example be put in the path leading towards the DHCP server(s), or these two may be in a single box, or the function of the MM may be implemented in an enhanced DHCP server.

On reception of a DHCP request including the preferred IP address, the DHCP server simply sends a confirming answer, ensuring the requester that it can continue to use its existing IP address. The MM inspects the relayed DHCP request packet to see if it comes from an access router that is foreign to the requested IP address (i.e. is in a different prefix). In this case, the MM initiates the reconfiguration of the network to be able to deliver IP packets sent to/from the MN, which now resides at a new location in a foreign IP domain but which kept its original IP address. The reconfiguration task is described later on.

Authentication Trigger

If the terminal is equipped with layer two authentication capabilities such as 802.1x (e.g. WPA in wireless LAN cards), the terminal must re-authenticate itself each time it changes to a new access point. If the authentication is forwarded to an AAA server, like in case of 802.1i, a Mobility Manager entity could oversee, or otherwise be informed of the authentication process between the AAA server and the terminal. Once the MM finds that the MN is authorized (through the authentication reply) to access the L2 network, it initiates the reconfiguration of the network to be able to deliver IP packets sent to/from the MN to/from its new location. The reconfiguration task is described later on.

Even after authentication, the terminal may send DHCP messages to acquire a new configuration. The DHCP server should give the same IP address for the MN as before. This is easy, since the MN may include its current IP address in the DHCP request message.

Preparing Downlink

To ensure that the packets sent to the original IP address of the MN are delivered to the MN at the new physical location in a foreign IP domain two conditions are important:

1) The original access router to which the IP address of the MN belongs must know the MN's actual location, and must be able to redirect the traffic there.
2) The access router serving the MN's actual domain must be able to deliver traffic to an IP address foreign to it.

To meet the first condition some kind of tunneling is normally applied. The IP protocol provides means for encapsulating a complete IP packet into another IP packet. This is called IP-in-IP encapsulation. When applying this mechanism, the IP packet to be encapsulated is taken as it is and put into the payload part of a new IP packet. The protocol field in the outer IP header is set to 4, which informs the destination in the outer header that the payload of the packet is another IP packet and so it must be handled accordingly. For increased security, the tunnels between the access routers may also be IPSec tunnels but any other tunneling scheme, like GRE or MPLS, is appropriate if implemented in the routers.

Tunnels are usually created by setting up virtual interfaces representing the entry point of the tunnel. In our proposed architecture, the virtual interfaces of the tunnels are assumed to be pre-established. However, the setup of such tunnels may be triggered by the MM on-demand when it detects that the MN sends a DHCP request or performs authentication from an IP domain different to its previous location. In this case, the MM taps into the original access router and sets up an IP tunnel interface towards the new access router. In any case, the MM must install a new static route entry into the original access router's routing table, which directs packets destined to the MN into the IP-tunnel interface. The protocol with which the MM can remotely configure the access router can be but is not limited to any of the following: CLI commands, SNMP, DHCP, and NetConf.

This tunnel ensures that from this point the original access router encapsulates (using the mechanism described above) every IP packet destined to the MN into another IP packet which is destined to the access router serving the MN. This is fully true for packets received from the operator's L3 network.

However, note that the MN may also wish to communicate with terminals connected to the access network that the MN has left. This communication requires other tricks as well. In such a case the terminals believe that they are in the same subnet, and try to reach each other directly on layer 2. It results that packets are not sent to the access router but instead are sent to the other party with layer 2 addressing, which will fail. In other words, when communicating mobile terminals try to reach each other directly on layer 2, packets will not be sent to the access router and therefore the above-described tunneling mechanism will not work properly. In order for a terminal remaining in the original access network to be able to reach the moving terminal through the tunnel, two main options can be applied:

All terminals receive IP addresses from the DHCP server with a 255.255.255.255 (/32) netmask, which means that any traffic is sent to the default gateway (i.e. the access router). This ensures that two terminals never believe that they are on the same IP subnet.

A feature of this solution is that all traffic passes the access router, i.e. users cannot communicate directly on the access network. This maybe useful for charging and metering purposes for the access provider.

If the terminals on the original subnet receive IP addresses with a shorter prefix (e.g. /24), they normally believe to be on the same L2 network as the MN (since it has an IP address within their own prefix). To overcome this, the old access router should answer all ARP requests for the MN when it is in a foreign network. An appropriate candidate for this purpose is the Proxy ARP feature, which (if activated) makes the router answer every ARP request for IP addresses that it sees via interface different from that the request arrived on. The proxy ARP will work since the old AR sees the MN on another interface after the re-configuration (i.e., on its virtual tunnel interface). The ARP proxy may be switched on initially or during the (re)configuration by the MM.

For providing session continuity when the MN is communicating with a terminal in the same access network, the terminal's ARP cache entry for the MN must be deleted. Otherwise for a few seconds it will use the MN's MAC address, which it can find in its own cache, instead of the access router's MAC address. An ARP spoofing technique has to be used to correct the ARP cache entry. One must replace the original MAC address assigned to the MN's IP address with the access router's MAC address. With ARP spoofing this is achieved by sending into the access network's broadcast MAC address a frame with the source MAC address of the old access router. This MAC frame should contain an IP packet the content of which is irrelevant. The IP header's source IP address must be set to the MN's IP address. This ARP spoofing could be achieved in three possible ways:

If the access router itself has the capability to do ARP spoofing, the MM has to remotely instruct the AR to perform the above described action. Even if the router does not directly offer such function, it may be possible to write a user space program on the router.

A new node is put into the access network (e.g. a Linux box) with the purpose of providing this ARP spoofing functionality. In this case, the MM has to remotely instruct this node to perform the spoofing.

If the access router supports MAC-in-IP decapsulation, the MM may itself generate the necessary MAC frame described above, and send it with an IP tunnel to the access router. Candidate IP tunnels that could transmit Mac packets are EtherIP [3], and L2TP [4].

In networking, ARP (Address Resolution Protocol) is a standard method for finding a host's hardware address when only its network layer address is known. ARP is not an IP-only or Ethernet-only protocol. It can be used to resolve many different network-layer protocol addresses to hardware addresses, although due to the overwhelming dominance of IP and Ethernet, ARP is primarily used for translating IP addresses to Ethernet MAC addresses. It may also be used for IP over other LAN technologies such as Token Ring, FDDI, or IEEE 802.11, and for IP over ATM.

By applying the method(s) detailed above it is ensured that the downlink packets are delivered to the last router in the IP path, i.e. the new access router serving the L2 link towards the MN. That is, condition (1) is fulfilled.

In order to ensure that the new access router is able to deliver the packet to the MN, i.e. to fulfill condition (2), some configuration changes must be applied in the new access router too. The required configuration is simply an installation of a new static route towards the MN's original /32 IP address. This new static route has to be set in order for the router to see the MN's old IP address directly connected to it, overwriting the routing table entry learned by the routing protocols.

Preparing Uplink

By performing the configuration steps described so far it is ensured that the downlink packets destined to the MN are delivered to the right location. In order for the MN to be also able to send packets to the rest of the world, the following solution variants are appropriate:

The proxy ARP feature in the new access router is switched on. The MN receives the same IP address as before with its original netmask. The default gateway is unchanged. So the new access router will answer the MN's ARP requests both for its original default gateway and for other hosts on the original subnet.

The proxy ARP feature in the new access router is switched on. The mobile terminal receives its previous IP address with a 32 bit netmask and the default gateway of the terminal re-set to its own interface with which it connects to the access network (i.e. default gateway=IP address of the terminal). Note that this configuration can be implemented via standard DHCP. Proxy ARP in the new access router is required so that ARP requests for IP addresses outside the new access network are answered by the new AR. However, hosts which are in the same access network answer requests for their IP addresses.

The new access router does not need to run proxy ARP if the MN receives its original IP address with a 32 bit netmask but the default gateway of the MN is re-set to the new access router. In this case, the default gateway is not on the same subnet as the MN, therefore the MN also requires a route to the default gateway. With standard DHCP it is possible to configure a static route in the MN for the default gateway as the destination. This static route must point to the interface of the mobile terminal attached to the L2 access network.

A proposed exemplary solution for establishing the uplink relies on DHCP communication. Even if the authentication based triggering is used, the MM may send so called forced DHCP messages to the MN to reconfigure its netmask or default gateway.

In the first two uplink solutions it is required to clear the ARP cache of the MN so that it will need to make ARP requests for the hosts in its original subnet. This can happen with the previously detailed ARP spoofing techniques. In addition to those solutions, DHCP gives another solution to erase the ARP cache of the MN. The ARP cache timer can be set by DHCP. That is, the DHCP server may first set the MN's ARP cache timer to zero (or to some very small value) and after some short time it may set the value again to a normal time. The second setting could be achieved by forced DHCP messages or by setting the lease time for the first message to a small value.

Moving From a Foreign Subnet to Another Subnet

If the MN moves from a foreign subnet to another foreign subnet, the home access router and the new access router must be configured as described above. However, the foreign access router in the subnet from where the terminal moves away must be reconfigured such that the static route entry is deleted.

If the MN moves back to its home network, then the access router in its home network must also delete the static route entry for the MN's IP address.

Enhancements

Soft States

In an advantageous embodiment the MM may delete the static route entries from the access routers if they are not used for some time. This may be achieved by using soft states in the MM.

For each MN, the MM could run a timer, which—if it expires—triggers the MM to remove the static route entries for this MN from the corresponding access routers. By setting the DHCP lease time to an appropriate small value, the periodical DHCP requests of the MN could be used to restart the timer.

Direct Tunnels from the Internet Gateway

Figure 11:
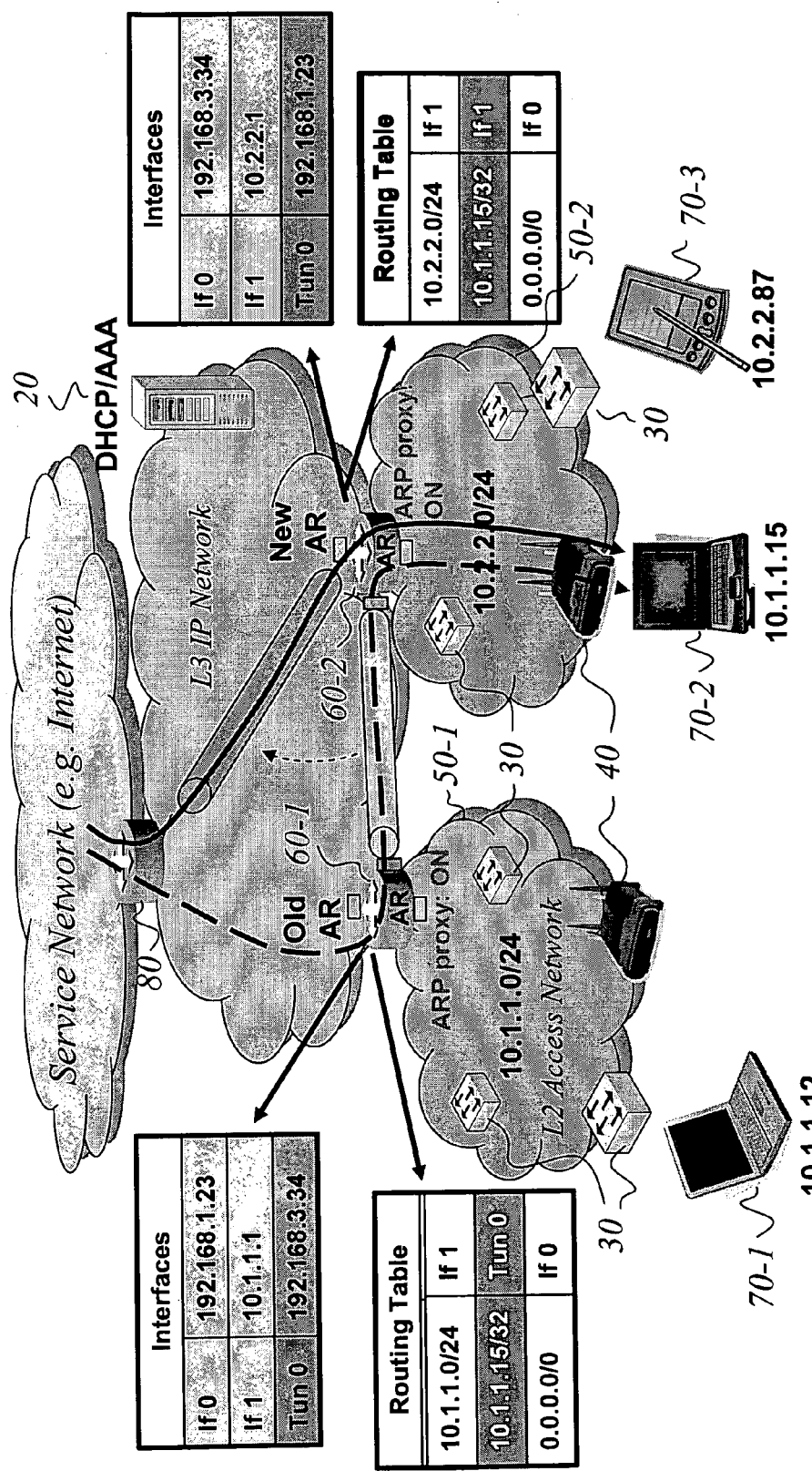
FIG. 11 is a schematic network diagram illustrating so-called Internet Gateway optimization according to an exemplary embodiment of the invention.

In the previously described solutions, all traffic destined to a MN will primarily flow through the original access router. However, it is possible to optimize traffic e.g. from a service network such as the Internet by setting direct tunnels from the Internet gateways towards the access points, as schematically illustrated in FIG. 11. As exemplified in FIG. 11, a direct tunnel is established between the Internet gateway 80 and the access router 60-2 of the access network 50-2, keeping in mind that the considered mobile terminal 70-2 has moved to the access network 50-2. In this case, the MM (which for example may be implemented in the DHCP/AAA server 20) has to add a static route entry in the Internet gateway 80 for the MN's /32 destination address to point to the virtual interface that corresponds to the IP tunnel leading to the new access router 60-2.

This way, traffic from the gateway flows directly to the new access router. If this is not used, traffic first flows to the original access router, which tunnels it to the new access router. With reference to FIG. 11, the dashed line illustrates the path traffic passes without the above-described route optimization. In this case, traffic is always forwarded to the old access router 60-1 where the IP address of the mobile terminal 70-2 is topologically correct, and then tunneled further to the new access router 60-2 actually serving the mobile terminal. The solid line illustrates the path with route optimization. In this case, the traffic is directly forwarded from the Internet gateway 80 to the actual access router 60-2.

An Internet gateway is basically a serving node in the operator's network that is used to provide connection towards the Internet or similar service. The gateway may be integrated into a router or vice versa, or the gateway and router may be arranged in a combined node. Anyway, the Internet gateway is associated with router functionality.

IPv6 Considerations

The above described methods are mainly based on IPv4 terminology and protocols. However, the solutions are similar in case of IPv6 as well: IP-in-IP encapsulation (tunneling); remotely adding/deleting route entries to/from the routing tables of access routers/gateways; and DHCP or authentication based triggers. The main differences are the following:

IPv6 ARP is replaced by the Neighbour Discovery protocol.

After establishing a L2 connection, the terminal will first send Router Solicitation messages and receives Router Advertisement messages from the AR. The terminal will use DHCPv6 only if Router Advertisement is not received or if it is received and explicitly allows using DHCPv6.

The address length in IPv6 is not 32 bits but 128 bits. Correspondingly, appropriate destination addresses (so called host routes) have to be added to the routers.

One of the advantages of the proposed architecture is that it provides mobility between access domains without requiring non-standard functional support from the terminals and from most of the network elements (routers, switches, access points). This makes it usable for most of existing laptops and PDAs whose operating systems generally do not support mobility. It is only the Mobility Manager that requires new functionality.

The solution works in any existing IP based transport network technology (IPv4, IPv6, MPLS) without interfering with existing protocols and services (VPNs) already deployed. It also works for any combination of core and access networks (IPv4 or IPv6) without changing the protocol stack on MNs.

The embodiments described above are merely given as examples, and it should be understood that the present invention is not limited thereto.

ABBREVIATIONS

3GPP 3$^{rd}$ Generation Partnership Project
AAA Authentication, Authorisation, Accounting
AR Access Router
ARP Address Resolution Protocol
AS Autonomous System
BU Binding Update
CIP Cellular IP
CoA Care-of-Address
DHCP Dynamic Host Configuration Protocol
GRE General Routing Encapsulation
HA Home Agent
HMIP Hierarchical Mobile IP
HoA Home Address
IETF Internet Engineering Task Force
IGP Interior Gateway Protocol
IP Internet Protocol
L2 Layer 2
L2TP Layer 2 Tunneling Protocol L3 Layer 3
LAN Local Area Network
LCoA On-Link Care-of-Address
MAR Mobility Aware Router
MIP Mobile IP
MM Mobility Manager
MN Mobile Node
MPA Mobility Plane Architecture
MPLS Multi-Protocol Label Switching
netlmm Network-based Localized Mobility Management
RCoA Regional Care-of-Address
RTGWG Routing Working Group (in IETF)
WLAN Wireless LAN
WiMAX Worldwide Interoperability for Microwave Access
WPA Wi-Fi Protected Access

REFERENCES

[1] *Mobility Support in IPv6*, RFC 3775.
[2] *Hierarchical Mobile IPv6 mobility management (HMIPv6)*, Hesham Soliman, Claude Castelluccia, Karim El-Malki, Ludovic Bellier, IETF draft, June, 2003.
[3] *EtherIP*, RFC 3378.
[4] *L2TP*, RFC 3931.
[5] *The NetLMM Protocol*, H. Levkowetz, Ed., IETF draft, Oct. 5, 2006.
[6] *Proxy Mobile IPv6*, S. Gundavelli, K. Leung, V. Devarapalli, K. Chowdury, IETF draft, Jan. 5, 2007.

The invention claimed is:

1. A method of supporting mobility between access domains in an Internet Protocol (IP) network, said method comprising the steps of:
a mobility manager maintaining a database of currently attached devices and their current access domain location;
said mobility manager detecting, for a device registered in said database, a change of access domain from a first access domain to a second access domain by monitoring connection maintenance signaling related to said device and intercepting connection maintenance signaling between said device and a control node in the network;
said mobility manager arranging for, in response to said detected change of access domain, a reconfiguration of the network, by performing remote router configuration, to forward traffic destined to an IP address of said device in said first access domain to a new location in said second access domain, thereby allowing said device to keep said IP address when moving between access domains,
wherein said mobility manager is implemented in a single node or block in the network.

2. The method of claim 1, wherein said connection maintenance signaling includes at least one of authentication signaling and address configuration signaling.

3. The method of claim 1, wherein said connection maintenance signaling includes address configuration signaling in the form of DHCP (Dynamic Host Control Protocol) signaling, and said control node is a DHCP server.

4. The method of claim 1, wherein said connection maintenance signaling includes authentication signaling, and said control node is an AAA (Authentication Authorization Accounting) server.

5. The method of claim 1, wherein said change of access domain is representative of said device moving to a new access router, and said access domains are IP subnets, and said device is a mobile terminal moving from one IP subnet to another IP subnet while the mobility manager ensures that the mobile terminal keeps its IP address.

6. The method of claim 1, wherein said step of arranging for a reconfiguration of the network comprises the steps of:
establishing a first static route entry, in one of an access router of said first access domain and an Internet gateway of the network, for the destination address of said device directing to a tunnel leading to an access router of said second access domain; and
establishing a second static route entry, in the access router of said second access domain, for the destination address of said device pointing to a directly connecting interface to which the device is now attached.

7. The method of claim 6, wherein said mobility manager detects a further change of access domain from said second access domain to a third access domain, and said first static route entry is changed to direct to a tunnel leading to an access router of said third access domain, said second static route entry in the access router of said second access domain is deleted, and a third static route entry, in the access router of said third access domain, is added for the destination address of said device pointing to a directly connecting interface to which the device is now attached.

8. The method of claim 1, further comprising the step of arranging for a reconfiguration of the network to forward traffic from said device through said second new access domain.

9. The method of claim 1, further comprising the steps of using Proxy ARP (Address Resolution Protocol) and ARP spoofing when said device moved from said first access domain to said second access domain and needs to communicate with another device located in said first access domain.

10. A system for supporting mobility between access domains in an Internet Protocol (IP) network, said system comprising:
means for maintaining a database of currently attached devices and their current access domain location;
means for detecting, for a device registered in said database, a change of access domain from a first access domain to a second access domain by monitoring connection maintenance signaling related to said device;
wherein said means for detecting a change of access domain comprises means for intercepting connection maintenance signaling between said device and a control node in the network;
means for arranging for, in response to said detected change of access domain, a reconfiguration of the network, by means of remote router configuration, to forward traffic destined to an IP address of said device in said first access domain to a new location in said second access domain to allow said device to keep said IP address when moving between access domains,
wherein said means for maintaining a database, said means for detecting a change of access domain and said means for arranging for a network reconfiguration are implemented in a mobility manager, which is implemented in a single node or block in the network.

11. The system of claim 10, wherein said connection maintenance signaling includes at least one of authentication signaling and address configuration signaling.

12. The system of claim 10, wherein said connection maintenance signaling includes address configuration signaling in the form of DHCP (Dynamic Host Control Protocol) signaling, and said control node is a DHCP server.

13. The system of claim 10, wherein said access domains are IP subnets, and said device is a mobile terminal moving from one IP subnet to another IP subnet while a mobility manager of said system ensures that the mobile terminal keeps its IP address.

14. The system of claim 10, wherein said means for arranging for a reconfiguration of the network comprises:
   means for establishing a first static route entry, in one of an access router of said first access domain and an Internet gateway of the network, for the destination address of said device directing to a tunnel leading to an access router of said second access domain; and
   means for establishing a second static route entry, in the access router of said second access domain, for the destination address of said device pointing to a directly connecting interface to which the device is now attached.

15. The system of claim 10, further comprising means for arranging for a reconfiguration of the network to forward traffic from said device through said second new access domain.

16. A mobility manager for supporting mobility between access domains in an Internet Protocol (IP) network, said mobility manager comprising:
   means for interfacing a database of currently attached devices and their current access domain location;
   means for obtaining, for a device registered in said database, an indication of a change of access domain based on monitoring connection maintenance signaling related to said device;
   wherein said means for obtaining an indication of a change of access domain comprises means for intercepting connection maintenance signaling between said device and a control node in the network;
   means for arranging for, in response to said indication of a change of access domain, a reconfiguration of the network, by means of remote router configuration, to forward traffic, destined to an IP address of said device in a first access domain, to a new location of said device in a second different access domain to allow said device to keep said IP address when moving between access domains,
   wherein said mobility manager is implemented in a single node or block in he network.

17. The mobility manager of claim 16, wherein said connection maintenance signaling includes at least one of authentication signaling and address configuration signaling.

18. The mobility manager of claim 16, wherein said connection maintenance signaling includes address configuration signaling in the form of DHCP (Dynamic Host Control Protocol) signaling.

19. The mobility manager of claim 16, wherein said access domains are IP subnets, and said device is a mobile terminal moving from one IP subnet to another IP subnet while said mobility manager is configured to ensure that the mobile terminal keeps its IP address.

20. The mobility manager of claim 16, wherein said mobility manager is implemented in one of an AAA (Authentication Authorization Accounting) server and a DHCP (Dynamic Host Control Protocol) server.

* * * * *

UNITED STATES PATENT AND TRADEMARK OFFICE
CERTIFICATE OF CORRECTION

PATENT NO. : 8,325,626 B2
APPLICATION NO. : 12/523664
DATED : December 4, 2012
INVENTOR(S) : Toth et al.

It is certified that error appears in the above-identified patent and that said Letters Patent is hereby corrected as shown below:

In Column 4, Line 42, delete "DHCP/AAA," and insert -- DHCP/AAA --, therefor.

In Column 18, Line 12, in Claim 16, delete "he" and insert -- the --, therefor.

Signed and Sealed this
Nineteenth Day of March, 2013

Teresa Stanek Rea
*Acting Director of the United States Patent and Trademark Office*